United States Patent Office 3,339,940
Patented Sept. 5, 1967

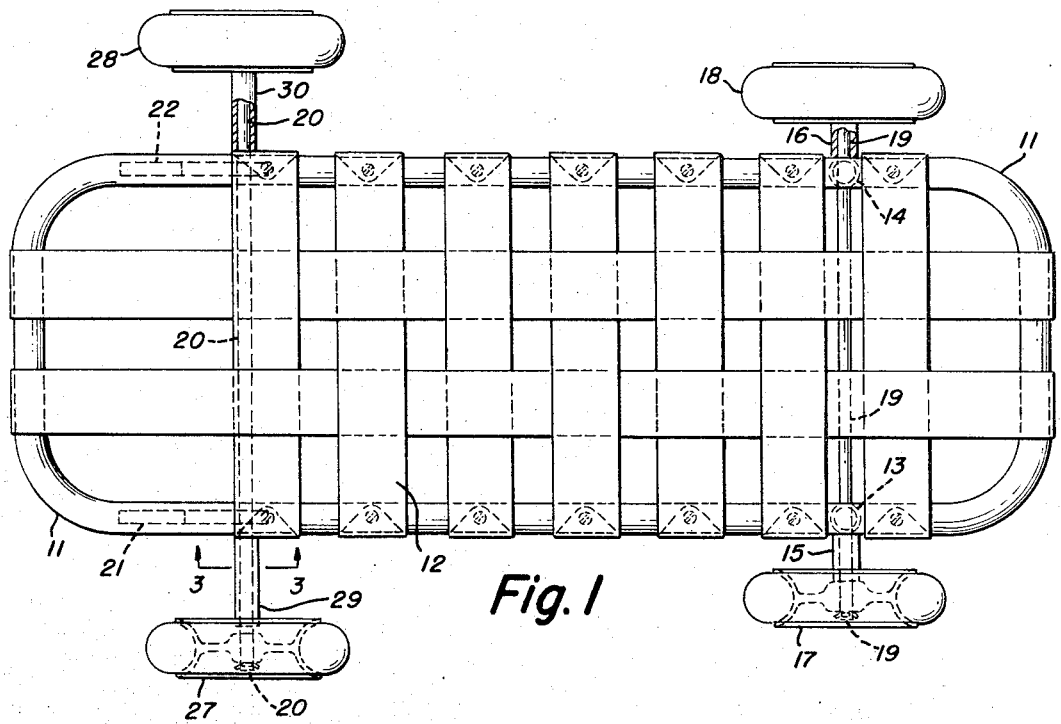
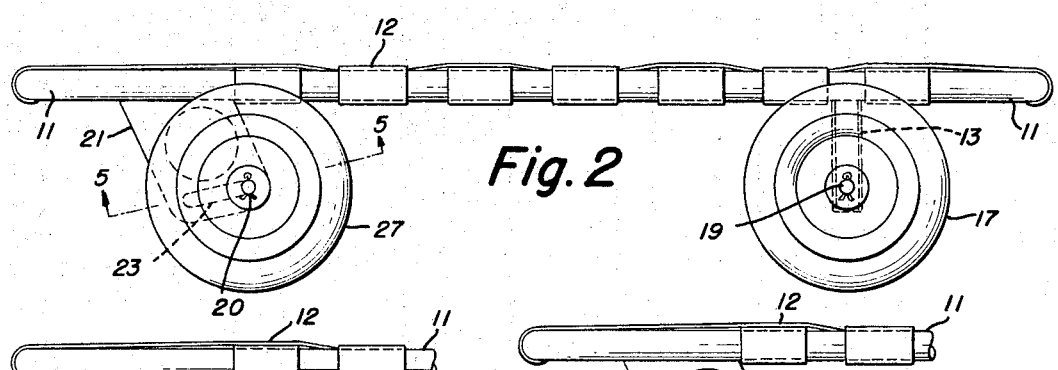
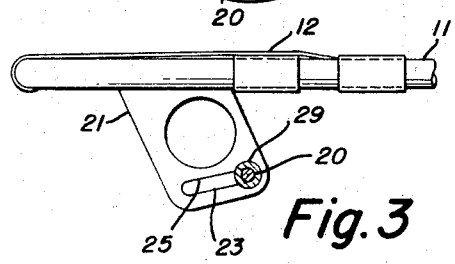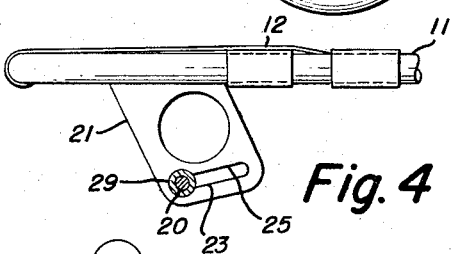
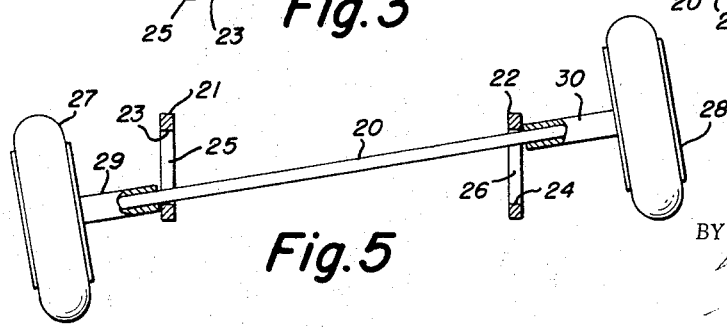
INVENTOR.
WILLIAM A. ANTHONY

3,339,940
COASTING VEHICLE
William A. Anthony, 19522 Coffinberry Blvd.,
Fairview Park, Ohio 44126
Filed Oct. 20, 1965, Ser. No. 498,708
10 Claims. (Cl. 280—87.01)

ABSTRACT OF THE DISCLOSURE

A coaster vehicle steered by means of a front wheel-carrying axle which is disposed in two slots in brackets on the opposite sides of the vehicle near the front, the slots being inclined upwardly and then extend rearwardly, the axle being free of any vertical pivot pin about which a steering axle usually pivots in other vehicles. Sleeves about the axles outboard of the brackets provides handles for the operator steering the vehicle by pulling and pushing in opposite directions on the sides of the vehicle, which sleeves also serve the purpose of limiting movement axially of the shaft through the slots, the sleeves being of a length to accommodate for variation in the length of axle protruding out from the brackets at different angles relative to the brackets.

---

My invention relates to coasting vehicles used for recreation or amusement by children and others.

An object of my invention is to provide an improved coasting vehicle of simple and sturdy construction, light in weight, and utilizable for providing unique coasting and steering functions.

Another object is the provision of a coasting vehicle having a unique and improved steering mechanism.

Another object is the provision for simplicity in a steering mechanism of a vehicle and providing unique characteristics in operation.

Another object is the provision for simultaneously banking or tilting the front portion of a vehicle upon turning of the front wheels thereof.

Another object is the provision for obtaining the banking or tilting of a vehicle toward the side on which the vehicle is being steered in a turning operation.

Another object is the provision for raising a vehicle body on the side away from which the vehicle is being turned in a steering operation.

Other objects and a fuller understanding of the invention may be had by referring to the following description and claims, taken in conjunction with the accompanying drawing, in which:

FIGURE 1 is a plan view of a vehicle embodying the preferred form of my invention;

FIGURE 2 is a left-hand side view of the vehicle shown in FIGURE 1;

FIGURE 3 is a partial view taken through line 3—3 of FIGURE 1 and showing the axle in a rearward position;

FIGURE 4 is a view similar to that of FIGURE 3 but showing the axle in a forward position and with the vehicle body above the axle raised from that shown in FIGURE 3; and FIGURE 5 is a cross-sectional view looking upwardly in the direction of the arrows 5—5 of FIGURE 2 but showing the front axle swung so as to be positioned rearwardly on the left side of the vehicle and forwardly on the right side of the vehicle.

My improved coasting vehicle has a body frame 11 formed of tubing bent in the general shape of a rectangle disposed in a horizontal plane. Mounted upon this body of tubing is webbing 12 interwoven as shown and secured to the tubing so as to provide a platform in the plane of the tubing. This webbing is fabric, woven plastic fibers or plastic film, as desired, and has the required strength for supporting the body of a person lying prone, face down, on the webbing. It is also sufficiently yieldable as to provide comfort for the person lying on the body 11. As the left-hand side of the vehicle shown in FIGURES 1 and 2 is the forward end of the vehicle, the body of the person lying prone would be extended with the head proximate to the forward end and the feet disposed proximate to the rearward end.

Secured by welding or other suitable means to the tube frame are a pair of bolsters, rear bolster 13 on the left side and rear bolster 14 on the right side. These bolsters at the lower end thereof have aligned openings through which extend a rear axle 19. On the left side of the vehicle, a rear wheel 17 is mounted on the axle 19 and on the right side a rear wheel 18 is mounted. A spacer 15 is interposed between the bolster 13 and rear wheel 17 and is concentric with the axle 19. Similarly, a spacer 16 is interposed between the bolster 14 and the rear wheel 18 and is concentric with the axle 19. These spacers 15 and 16 are sleeves mounted on the axle 19 and maintain the axial position of the wheels 17 and 18 relative to the frame body 11. The wheels 17 and 18 freely rotate as the vehicle moves along the ground surface. Mounted on the rim of wheels 17 and 18 are pneumatic tires which are somewhat soft and pliable although inflated with air so as to provide a "soft" or yieldable ride for the person coasting on the vehicle.

Mounted by welding or other suitable means to the tubing of the body 11 and on opposite sides thereof are brackets in the form of plates extending downwardly from the horizontal plane of the body 11. On the left side left front bracket 21 extends downwardly and on the right side right front bracket 22 extends downwardly. These brackets are preferably of aluminum or other suitable material in the form of plates having the form illustrated. For reducing weight, relatively large circular blanks may be removed from the brackets as shown. The planes of the brackets 21 and 22 are parallel to each other and they are spaced equidistantly from the longitudinal axis of the body 11. Formed in the left front bracket 21 is a slot or elongated opening 23 and formed in the right front bracket 22 is a similar slot or elongated opening 24. These slots 23 and 24 are both inclined downwardly and forwardly relative to the body 11. The upper edge 25 of slot 23 forms an inclined camming surface therealong. The upper edge 26 of slot 24 provides an inclined camming surface therealong. These inclined camming surfaces are in the same plane and each extends forwardly and rearwardly the same distances relative to the body 11. The ends of the slots provide limit stops extending downwardly from the respective camming surfaces.

Extending through the two slots 23 and 24 is a front axle 20 of steel or other suitable material. This front axle 20 extends transversely across the body outwardly equal distances beyond the brackets 21 and 22. The weight of the body 11 and brackets 21 and 22 is borne by the front axle 20 so that the camming surfaces 25 and 26 provide bearing surfaces engaging the top surface of the axle 20. Mounted upon the left-hand end of the axle 20 is a left front wheel 27 and mounted on the right-hand end of axle 20 is a right front wheel 28. These wheels also have mounted thereon pneumatic tires which are relatively soft and pliable, although inflated with air, so as to give a relatively "soft" or yieldable ride to the person on the vehicle.

Mounted on the front axle 20 between the bracket 21 and the left front wheel 27 is a left front sleeve member 29. Similarly mounted on the axle 20 between the bracket 22 and the right front wheel 28 is a right front sleeve member 30. These sleeve members 29 and 30 provide hand grips for the person riding in a prone position, face down, on the vehicle so that the left-hand of the person may seize or hold sleeve member 29 and the right hand may seize or hold sleeve member 30. The person may then freely swing the front axle between its limits about a vertical axis intersecting the longitudinal axis of the vehicle. The sleeve members 29 and 30 are long enough to keep the front wheels 27 and 28 spaced outwardly from the brackets 21 and 22 but are sufficiently short as to allow for the swinging of the front axle between the extreme limits of its swinging movement.

As seen in FIGURE 3, when the front axle 20 is rearwardly moved in a slot, such as slot 23 on the left-hand side of the vehicle, the plane of the body 11 is at its lowest elevation relative to the axle 20 and to the ground surface upon which the vehicle is being supported on its left side. As seen in FIGURE 4, when the axle 20 is moved forwardly to its forwardmost position in slot 23, then the plane of the body 11 is raised from that shown in FIGURE 3 at an elevation above the axle 20 on that side and relative to the ground surface supporting the vehicle on that side. Thus, the sides of the vehicle at the forward end thereof are elevated in proportion to the degree to which the axle 20 is swung forwardly or rearwardly in the respective slots. As seen in FIGURE 5, upon the front axle 20 being swung to steer the vehicle to the left, the vehicle on the side over the bracket 21 is at its lowermost elevation and the vehicle over the bracket 22 is raised to its uppermost elevation. In this way, the vehicle is automatically banked or tilted at its front end in accordance with the direction in which the vehicle is steered by the swinging of the front axle 20. Steering to the left causes the right side to be raised relative to the left side, and correspondingly, steering to the right causes the left side to be raised relative to the right side. There is thus provided automatic banking operation which is simultaneous with the steering operation. The steering mechanism is relatively simple and sturdy in construction.

The present disclosure includes that contained in the appended claims, as well as that of the foregoing description.

Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and scope of the invention as hereinafter claimed.

What is claimed is:

1. In a coasting vehicle, the combination of a body frame, a front steering axle, a pair of front wheels mounted on the steering axle adjacent the ends thereof, respectively, for supporting the forward end portion of the body, a pair of brackets spaced apart in upright parallel planes laterally of the body and secured thereto, said brackets extending downwardly from said body, each of said brackets having a slot extending therethrough and accommodating said steering axle, said steering axle being freely slidable in said slots and unrestrained between said brackets against movement in a plane common to said slots, the steering axle extending between said brackets and therethrough a lateral distance outwardly from each of said brackets, the wheels on said steering axle being variably spaced from said brackets in accordance with variable angles of the steering axle relative to the longitudinal axis of the body, a pair of sleeve members mounted on said steering axle outwardly of said brackets, one sleeve member being positioned between each wheel and bracket, the slot in each said bracket being extended longitudinally of the frame to permit swinging of said steering axle into variable angular positions relative to the frame axis during the steering of the axle by relative forward and rearward movements of opposite ends of said steering axle, said slot in each bracket also being inclined downwardly from the plane of said body and forwardly of said body to provide an inclined camming surface defining the top edge of said slot, said camming surfaces supporting said body on said steering axle extended through the respective slot in engagement with said camming surface, said camming surfaces engaged by said axle raising the bracket on the side of the body upon which the axle is moved forwardly at its respective slot, and correspondingly lowering the bracket on the side of the body upon which the axle is moved rearwardly in its respective slot, whereby the forward portion of the body is banked in accordance with the swinging of the axle in said slots, said sleeve members limiting axial movement of said steering axle relative to said brackets and accommodating the variable spacing of said front wheels from said brackets in swinging at variable angles to the longitudinal axis of the body.

2. The combination claimed in claim 1 and in which said sleeve members provide gripping surfaces accessible to the operator of the coasting vehicle riding on said body for manual seizing of the sleeve members and pushing and pulling thereof for the steering of said axle.

3. In a coasting vehicle having a horizontally disposed body, a front steering axle carrying front wheels supporting the forward part of the body, said axle being swingable to turn the direction of said front wheels in the steering of the vehicle, and a pair of parallel vertically disposed brackets carried by the body and extending downwardly from laterally spaced locations at said forward part of the body, the improvement of an elongated camming surface carried by each of said brackets extending parallel to each other and disposed on opposite sides of the longitudinal axis of the body and substantially equidistantly therefrom, said axle extending under and in bearing engagement with said camming surfaces whereby the axle supports said brackets and the forward part of the body, said axle being unrestrained between said brackets against movement in a plane common to said camming surfaces, limit means carried by each said bracket at spaced locations along each of said camming surfaces to provide for limited travel of said axle along said camming surfaces between the spaced limit means, said camming surfaces being inclined in the same direction relative to the plane of said body whereby as said axle, in being swung in steering the vehicle, moves in one direction longitudinally of the body along and in engagement with one of said inclined surfaces and simultaneously moves in an opposite direction longitudinally of the body along in engagement with the other of said inclined surfaces, said camming surfaces bearingly supported on said axle correspondingly varying the relative elevation of the respective brackets and the body at said laterally spaced locations, the outward extension of said axle from said brackets being variable in accordance with the angle of the axle to said brackets.

4. The improvement claimed in claim 3 and in which said camming surfaces are inclined downwardly as they extend forwardly to provide progressively greater vertical distance between the horizontal plane of the body and the axle as the axle moves forwardly and progressively lesser vertical distance between the horizontal plane of the body and the axle as the axle moves rearwardly, whereby the forward part of the body is banked in accordance with the direction of the swinging of said axle.

5. A coasting vehicle comprising in combination a tubular frame and sheet material secured thereto to form a body in a generally horizontal plane, rear bolster means connected to the frame, rear axle means carried by the rear bolster means, rear wheels carried by the rear axle means for supporting the rearward portion of the body, a pair of parallel spaced and vertically disposed plates secured to the frame on opposite sides of the forward portion of the body, said plates extending downwardly from the plane of said body and providing brackets supporting said forward portion, each of said plates having an elongated slot extending therethrough, the longitudinal axes of said slots being parallel to each other and to the longitudinal axis of said body, the upper edges of said slots being angularly disposed to said horizontal plane to incline downwardly from said plane as they extend in a forwardly direction, a front axle extending through said slots and bearing on the upper edges thereof in supporting said body, front wheels carried by said front axle which are steered by the swinging of said front axle at variable angles to the longitudinal axis of said body, the angular swinging of said front axle in the slots about a vertical axis varying the relative position of the front axle in the respective slots and along said upper edges and varying the extension of the axle outwardly of said brackets, forward movement of the front axle in a first slot raising the level of the body on the side over the first slot and simultaneous rearward movement of the front axle in the other slot lowering the level of the body on the side over said other slot, said arrangement providing for banking the level of the forward portion of the body in accordance with the angular swinging of the front axle.

6. The combination claimed in claim 5 and including means carried by said front axle adjacent each front wheel carried thereby and laterally outward of said plates for limiting axial movement of said front axle and of the wheels carried thereby relative to said plates and permitting variation in the spacing of the front wheels from said plates to accommodate for the said angular swinging of said front axle and of the corresponding variation in the extension of the axle from said plates.

7. A vehicle comprising in combination a relatively flat body disposed in a normally horizontal plane adapted for supporting a person in a prone, downwardly-facing, coasting position, support means secured to the body for supporting the rearward portion of said body, a pair of downwardly-extending parallel brackets disposed in spaced upright planes and secured to the body on opposite sides of, and equidistantly from, the longitudinal axis of the body, each of said brackets carrying a downwardly-facing surface disposed at an angle to said horizontal plane, said surfaces being substantially in the same plane inclined downwardly and forwardly of the body from said horizontal plane, each of said brackets having portions providing stops at the opposite ends of the said surface carried thereby, a front axle extending transversely of the vehicle and under both said surfaces to bearingly engage the same for the support of the front portion of the body on said front axle, said front axle being unrestrained between said surfaces against movement in a plane common to said surfaces, wheels carried by said front axle at the opposite ends thereof for supporting the axle on a ground surface traveled by the vehicle, said front axle being swingable about a vertical axis extending substantially through the longitudinal axis of the body, the arrangement of said surfaces engaging said front axle being such that the distance between the axle and the plane of said body at a location above the bracket carrying a respective surface varies in accordance with the position of the axle along the said surface between said stops whereby the front portion of the body tilts in accordance with the swinging of said front axle.

8. The combination claimed in claim 7 and including a pair of sleeve members carried by the front axle, each sleeve member being positioned between a front wheel and adjacent bracket to limit axial movement of the front axle for maintaining the front wheels a minimum distance from the respective brackets, said sleeve members having a length to accommodate for variable spacing of the wheels from said brackets in said swinging of the front axle, said sleeve members also providing hand grips for the person on the vehicle for swinging the front axle in the steering of the vehicle.

9. In a coasting vehicle having a body in a relatively flat plane and a steering mechanism for steering the vehicle, said steering mechanism comprising a front axle swingable about a vertical axis for steering the front wheels carried by the axle, a pair of bolster spaced parallel members carried by the body and extending downwardly from the plane thereof on opposite sides of the body, and astraddle said vertical axis said bolster members each having a downwardly directed elongated bearing surface adapted to bearingly engage said axle for supporting the body on the axle solely on said bearing surfaces, said front axle being unrestrained against movement at said vertical axis, said bearing surfaces progressively extending downwardly away from said plane of the body as they extend forwardly whereby the elevation of the body above the axle is variable and dependent upon the position of the axle along the length of the bearing surface, said bolster members having stop portions at the opposite ends of the respective bearing surfaces for limiting movement of the axle therealong, said axle upon swinging about said vertical axis being movable in opposite directions along said bearing surfaces, the arrangement providing that forward movement of the axle along a first bearing surface causes an increase in the relative distance between the axle and said plane of the body on the side of the vehicle over said first bearing surface and simultaneous rearward movement of the axle along the other bearing surface causes a decrease in the relative distance between the axle and said plane of the body on the side of the vehicle over said other bearing surface.

10. Steering mechanism as claimed in claim 9 and including means mounted on said axle intermediate the wheels and bolsters, respectively, for limiting movement of the axle along its axis relative to said body.

References Cited
UNITED STATES PATENTS

| | | | |
|---|---|---|---|
| 329,927 | 11/1885 | Mendenhall | 280—11.28 |
| 1,387,091 | 8/1921 | Woolley et al. | 280—87.04 |
| 1,548,973 | 8/1925 | Beeler | 280—87.01 |
| 2,471,233 | 5/1949 | Monson | 280—266 X |

LEO FRIAGLIA, *Primary Examiner.*